United States Patent Office 3,003,921
Patented Oct. 10, 1961

3,003,921
METHOD OF PRODUCING L-GLUTAMIC ACID FROM RACEMIC GLUTAMIC ACID
Shukuo Kinoshita, Masao Tanaka, and Yo Kato, Tokyo, Japan, assignors to Kyowa Hakko Kogyo Co., Ltd., Tokyo, Japan, a corporation of Japan
No Drawing. Filed Sept. 12, 1960, Ser. No. 55,198
Claims priority, application Japan Sept. 11, 1959
17 Claims. (Cl. 195—29)

The present invention relates to a method for producing L-glutamic acid from racemic glutamic acid by use of the enzymatic action of a micro-organism. More particularly this invention relates to a method in which dehydration of L-glutamic acid (by the enzymatic action of *Pseudomonas cruciviae*) and racemization of remaining D-glutamic acid (by an aromatic or heterocyclic aldehyde having in a position ortho to the aldehyde group a radial coordinatable with metal, and a metallic ion) are allowed to take place concurrently, thereby converting racemic glutamic acid into L-2-pyrrolidone-5-carboxylic acid; the latter is then hydrolyzed to yield L-glutamic acid. L-glutamic acid produced is useful as a flavoring agent or flavor enhancer in a variety of food products.

It is an object of the present invention to obtain L-glutamic acid of a high purity with ease and in a higher yield from racemic glutamic acid by a short treatment, without conducting troublesome procedures, such as an optical resolution, etc. Other objects and advantages are apparent from the ensuing description.

The production of L-glutamic acid from racemic glutamic acid has heretofore been effected by resolving racemic glutamic acid into L- and D-isomers or their derivatives in a physical or biochemical way, racemizing the D-glutamic acid remaining after the resolution, resolving again the racemized glutamic acid in the same way, and repeating these procedures to convert the whole racemic acid into the L-acid. However, such repeated procedures are not only very complex and time consuming, but also result in low yields of L-glutamic acid, this giving rise to various technical and economic difficulties.

In a copending application Serial No. 850,755, entitled "Method for Producing L-Glutamic Acid From Racemic Glutamic Acid by Use of a Micro-Organism," by S. Kinoshita et al., filed on November 4, 1959, there is proposed an exceptionally superior method of resolving glutamic acid by dehydrating L-glutamic acid with *Pseudomonas cruciviae*. Research on the dehydration of L-glutamic acid and racemization of L-2-pyrrolidone-5-carboxylic acid, resulting from said dehydration, in the presence of (1) an aromatic or heterocyclic aldehyde having in its ortho-position a radical co-ordinatable with metal and (2) a metallic ion have now resulted in a novel method of readily converting racemic glutamic acid to L-glutamic acid.

Research on the racemization of amino acid in the presence of (1) an aromatic or heterocyclic aldehyde having in its ortho position a radical co-ordinatable with metal and (2) a metallic ion was conducted by Snell et al., and the reaction mechanism of the racemization has been clarified [J. Amer. Chem. Soc. 76, 648 (1954)]. The explanation of the mechanism for the racemization of an amino acid involves the formation of a complex compound from the metallic ion and the aromatic or heterocyclic aldehyde having in its ortho-position a radical co-ordinatable with metal in combination with carboxylic acid and the amino radical in the α-position of the amino acid, so that the hydrogen atom in the α-position is dissociated.

The present inventors perceived the structure of the α-position of L-2-pyrrolidone-5-carboxylic acid and inferred that the racemization might not occur in the case of this amino acid since the imino radical of the acid could form no complex compound with the aromatic or heterocyclic aldehyde having in its ortho-position a radical coordinatable with metal and the metallic ion. The inference was proved positively, establishing that L-2-pyrrolidone-5-carboxylic acid is not racemized in the presence of (1) an aldehyde having in its ortho-position a radical co-ordinatable with metal and (2) a metallic ion.

The foregoing is supported by the data in Table 1 obtained from aqueous solutions of L-glutamic acid and L-2-pyrrolidone-5-carboxylic acid each containing salicylaldehyde and a copper ion.

TABLE 1

*Racemization ratios (percent) of L-glutamic acid and L-pyrrolidone-5-carboxylic acid (at 75° C.)*

| Reaction Time (hour) | L-glutamic Acid | L-pyrrolidone-5-carboxylic acid |
|---|---|---|
| 0 | 0 | 0 |
| 1 | 75.2 | 0 |
| 2 | 88.1 | 0 |
| 3 | 98.4 | 0 |
| 4 | 99.6 | 0 |

As is obvious from Table 1, there is a specific difference between racemization, through a complex compound formation, of glutamic acid and of pyrrolidone-5-carboxylic acid, the latter not being racemized at all.

Besides, the inventors recognized that the enzymatic activity of *Pseudomonas cruciviae* is exceptionally powerful. Said activity is hardly affected by the presence of an aromatic or heterocyclic aldehyde or a metallic ion, so that L-glutamic acid is specifically dehydrated to L-2-pyrrolidone-5-carboxylic acid. Furthermore, they discovered that by the combination of the racemization reaction through said complex compound formation and the enzymatic conversion reaction of L-glutamic acid into L-2-pyrrolidone-5-carboxylic acid, racemic glutamic acid could be completely converted into L-2-pyrrolidone-5-carboxylic acid. By a concurrent advance of the both reactions, the reaction equilibrium moves interdependently so that racemic glutamic acid rapidly changes to L-2-pyrrolidone-5-carboxylic acid. L-glutamic acid can be thereby easily obtained in higher yields by hydrolyzing the formed L-2-pyrrolidone-5-carboxylic acid to L-glutamic acid. An extremely advantageous novel method for producing L-glutamic acid from racemic glutamic acid has been thus originated.

For the production of L-glutamic acid from racemic glutamic acid in accordance with the invention, the first step is to act an enzyme material, obtained by cultivation of *Pseudomonas cruciviae*, upon an aqueos solution of racemic glutamic acid in the presence of (1) an aromatic or heterocyclic aldehyde having in its ortho-position a radical coordinatable with metal and (2) a metallic ion. Thereby, L-glutamic acid in the solution is dehydrated by the enzymatic action to L-2-pyrrolidone-5-carboxylic acid; concurrently, the remaining D-glutamic acid is racemized, by movement of the reaction equilibrium, to give racemic glutamic acid. The resulting L-glutamic acid in the racemized acid is dehydrated as soon as it forms to yield L-2-pyrrolidone-5-carboxylic acid. Therefore, the velocity of the racemization reaction is extraordinarily increased. Furthermore, the dehydration reaction of the L-glutamic acid is extremely rapid since the amount of L-glutamic acid in relation to that of enzyme is always so small that the enzyme acts effectively. Thus, racemic glutamic acid is completely converted into L-2-pyrrolidone-5-carboxylic acid in a shorter period of time by the mutual action of (a) the enzymatic conversion of L-glutamic acid into L-2-pyrrolidone-5-carboxylic acid and (b) the racemization of D-glutamic acid.

In practicing the first step of the invention, it is preferable to add an aromatic or heterocyclic aldehyde and a metallic ion to an aqueous solution containing racemic glutamic acid and then to add an enzyme material to the mixture. Alternatively, the enzyme material may be added to the aqueous solution containing racemic glutamic acid, and then, immediately or after a while, the aromatic or heterocyclic aldehyde and the metallic ion may be added.

The enzyme material employed in the invention may be one which is obtained by cultivation of *Pseudomonas cruciviae*. The term, "enzyme material," used herein involves in its meaning a proliferated culture medium, cells recovered from the culture medium, the cell homogenates obtained by supersonic vibrations, the enzyme obtained therefrom and the like. *Pseudomonas cruciviae* is a known species, cultures of which are available in public culture collections. It may be isolated from soil and is identified by published descriptions, such as "Bergey's Manual of Determinative Bacteriology," Breed, Robert S., Murray, E. G. D., and Smith, Nathan R., seventh edition, The William & Wilkins Company, Baltimore, Md., 1957, for use in the present process.

The aromatic or heterocyclic aldehyde having in its ortho-position a radical coordinatable with metal is exemplified by salicylaldehyde. The term, "a radical coordinatable with metal," means a metallizable radical and encompasses the hydroxy group, i.e. OH; alkoxy group, e.g. $OCH_3$; amino group, e.g. $NH_2$, $N(CH_3)_2$, etc. Other examples of the aldehyde are pyridoxal, 5-deoxypyridoxal, pyridoxal phosphate, 2 - formyl-3-hydroxy-pyridine, 4-nitrosalicylaldehyde, 6-nitrosalicylaldehyde, 2-aminobenzaldehyde etc. The aromatic or heterocyclic aldehyde may be employed in a concentration of $\frac{1}{10}$ to $\frac{1}{20}$ mol per 1 mol of racemic glutamic acid.

The metallic ion to be added with the aldehyde is one which can be coordinated with the aldehyde. The preferred ions are $Ga^{+++}$, $Cu^{++}$, $Al^{+++}$, $Fe^{++}$, $Fe^{+++}$, $Zn^{++}$, $In^{+++}$, $Ni^{++}$, and $Co^{++}$. The metallic ion may be added in a concentration of $\frac{1}{20}$ to $\frac{1}{40}$ mol per 1 mol of racemic glutamic acid. Usually it is added in the form of a salt. Examples of preferred salts are chlorides, e.g. $CuCl_2$; bromides, e.g. $ZnBr_2$; iodides, e.g. $NiI_2$; sulfates, e.g. $Al_2(SO_4)_3 \cdot 18H_2O$, $Ga_2(SO_4)_3$; nitrates, e.g. $In(NO_3)_3 \cdot 3H_2O$; acetates, e.g. $Co(C_2H_3O_2)_2 \cdot 4H_2O$; and double salts, e.g. $(NH_4)Fe(SO_4)_2 \cdot 12H_2O$, $$K_2Fe(CN)_6 \cdot 3H_2O$$

Any other salt which contains an above specified metallic ion and which is soluble in water may also be used in the present process.

The reaction conditions of the first step may be varied broadly without inhibiting the enzymatic action. The preferable reaction temperature is from 50° to 70° C. The pH of the reaction mixture at the beginning is preferably about 8. The preferable concentration of the racemic glutamic acid in the reaction mixture is from about 10 to 100 milligrams per milliliter (mg./ml.). Usually a reaction period ranging from 4 to 10 hours suffices to obtain a quantitative yield.

The second step of the invention is the hydrolysis of the resulting L-2-pyrrolidone-5-carboxylic acid to L-glutamic acid. This step may be carried out after the isolation of the resulting L-2-pyrrolidone-5-carboxylic acid from the mixture of the first step, although the latter may be directly hydrolyzed.

The procedure of the isolation of L-2-pyrrolidone-5-carboxylic acid, if it is desired, can be carried out, for example, by extracting the aromatic or heterocyclic aldehyde at pH of about 1.0 with a suitable solvent, such as ether, removing the metallic ion and unreacted amino acid, if any, by means of, e.g., ion-exchange resin and then recovering the L-2-pyrrolidone-5-carboxylic acid in the solution.

The hydrolysis of L-2-pyrrolidone-5-carboxylic acid in accordance with the second step of the invention is conventional and may therefore be conducted by any of the procedures known to those skilled in the art.

The invention is illustrated by the following examples, which are not to be construed as limitative.

EXAMPLE 1

A culture medium containing 5 g. (grams) of meat extract, 2 g. of yeast extract, 1 g. of $K_2HPO_4$, 0.25 g. of $MgSO_4 \cdot 7H_2O$, 10 g. of NZ-amine (trade name for an enzymatic digest of casein for microbiological use), 10 g. of glucose, and water to make 1 liter, having a pH of 7.2, is inoculated with *Pseudomonas cruciviae* and cultivated at a temperature of 38° C. for 24 hours under aerobic conditions. After completion of the cultivation, the cells are separated from the culture medium by centrifugation at 5° C., washed with saline water, and dried by freeze-drying. The dried cells are thus obtained.

To 2000 ml. of an aqueous solution containing 100 g. of racemic glutamic acid are added 10 g. of 4-nitrosalicylaldehyde and 5 g. of cupric chloride. After adjusting the pH to 8.0, 1 g. of dried cells obtained above is added thereto. The reaction is allowed to proceed at a temperature of 60° C. for 5 hours, whereby glutamic acid in the solution is substantially completely converted into L-2-pyrrolidone-5-carboxylic acid. After termination of the reaction, the solution at a pH of 1.0 is extracted with half its volume of ether (diethyl ether) to recover 4-nitrosalicylaldehyde. The residue of the extraction is passed through a column filled with 100 g. of a strongly acidic ion exchange resin, Amberlite IR–120 (trade name for sulfonated polystyrene type resin), which is previously regenerated with 10% (by weight) hydrochloric acid and washed with water, whereby cupric ion and unreacted D-glutamic acid are wholly removed by adsorption. The effluent (2500 ml.) is concentrated to 400 ml. under reduced pressure and, at the same time, hydrolyzed by addition of 100 ml. of 32% (by weight) hydrochloric acid. When adjusting the pH to 3.2 with sodium hydroxide, crystals isolate. The crystals are separated and dried to yield 90 g. of L-glutamic acid.

EXAMPLE 2

From cells prepared in the same way as those of Example 1, a crude enzyme preparation is prepared as follows: (i) 8-gram portions of the lyophilized cells are treated with supersonic vibrations (10 kilo-cycles per second) at 0 to 3° C. in 80 milliliters of M/15 phosphate buffer for 30 minutes. (ii) After centrifugation at 8000× gravitational force for 10 minutes, the supernatant is allowed to stand in a water bath at 70° C. for 30 minutes. (iii) After centrifugation the supernatant (85 milliliters) is treated with 45 milliliters of saturated ammonium sulfate solution at 0° C. (to give 0.28 saturation). After 20 hours, the precipitate is removed and discarded. The resulting supernatant (127 milliliters) is then brought to 0.62 saturation by addition of ammonium sulfate powder. The resulting precipitate is removed by centrifugation and lyophilized.

To 1000 ml. of an aqueous solution containing 56 g. of racemic glutamic acid are added 5 g. of 6-nitrosalicylaldehyde and 15 g. of alum $[AlK(SO_4)_2 \cdot 12H_2O]$. After addition of 200 mg. of crude enzyme preparation of *Pseudomonas cruciviae* obtained as above, the reaction is allowed to proceed at a temperature of 50° C. and at a pH of 7.5 for 10 hours, whereby glutamic acid in the solution is converted into L-2-pyrrolidone-5-carboxylic acid. The reaction mixture is treated in the same way as that of Example 1. L-glutamic acid (48.5 g.) is obtained. This corresponds to 86.5% of the theoretical yield.

EXAMPLE 3

To 1500 ml. of an aqueous solution containing 75 g.

of racemic glutamic acid are added 7 g. of salicylaldehyde, 3 g. of cupric chloride, and 1 g. of dried cells of *Pseudomonas cruciviae* obtained as in Example 1. The reaction is allowed to proceed at a temperature of 70° C. and at a pH of 7.7 for 12 hours. The reaction mixture is treated in the same way as that of Example 1. L-glutamic acid (69 g.) is obtained. This corresponds to 92% of the theoretical yield.

It is thought that the invention and its advantages will be understood from the foregoing description, and it is apparent that various changes may be made in the process and composition without departing from the spirit and scope of the invention or sacrificing its material advantages, the process and composition hereinbefore described being merely illustrative of preferred embodiments of the invention.

What is claimed is:

1. A method of producing L-glutamic acid from racemic glutamic acid which comprises: (1) preparing a reaction mixture by combining with an aqueous solution of racemic glutamic acid (a) aldehyde having in a position ortho to the aldehyde group a radical coordinatable with metal, said aldehyde being a member selected from the group consisting of aromatic and heterocyclic aldehydes and (b) metallic ion coordinatable with the aldehyde; (2) subjecting said reaction mixture to the action of enzyme of *Pseudomonas cruciviae*, whereby the racemic glutamic acid is converted into L-2-pyrrolidone-5-carboxylic acid; and (3) hydrolyzing the L-2-pyrrolidone-5-carboxylic acid to L-glutamic acid.

2. The method according to claim 1 wherein the aldehyde is a member selected from the group consisting of salicylaldehyde, pyridoxal, 5-deoxypyridoxal, pyridoxal phosphate, 2-formyl-3-hydroxypyridine, 4-nitrosalicylaldehyde, 6-nitrosalicylaldehyde and 2-aminobenzaldehyde.

3. The method according to claim 1 wherein the concentration in the reaction mixture of the aldehyde is from $\frac{1}{10}$ to $\frac{1}{20}$ mol per 1 mol of racemic glutamic acid.

4. The method according to claim 1 wherein the metallic ion is a member selected from the group consisting of cupric, gallic, aluminum, ferrous, ferric, zinc, indium, nickelous, and cobaltous ions.

5. The method according to claim 1 wherein the concentration in the reaction mixture of metallic ion is from $\frac{1}{20}$ to $\frac{1}{40}$ mol per 1 mol of racemic glutamic acid.

6. The method according to claim 1 wherein the enzyme is in the form of dried cells.

7. A method of producing L-glutamic acid from racemic glutamic acid which comprises: (1) preparing a reaction mixture by combining with an aqueous solution of racemic glutamic acid (a) aromatic aldehyde having in its ortho-position a metallizable radical and (b) metallic ion coordinatable with the aldehyde; (2) subjecting said reaction mixture to the action of enzyme of *Pseudomonas cruciviae*, whereby the racemic glutamic acid is converted into L-2-pyrrolidone-5-carboxylic acid; and (3) hydrolyzing the L-2-pyrrolidone-5-carboxylic acid to L-glutamic acid.

8. A method of producing L-glutamic acid from racemic glutamic acid which comprises: (1) preparing a reaction mixture by combining with an aqueous solution of racemic glutamic acid (a) heterocyclic aldehyde having in its ortho-position a metallizable radical and (b) metallic ion coordinatable with the aldehyde; (2) subjecting said reaction mixture to the action of enzyme of *Pseudomonas cruciviae*, whereby the racemic glutamic acid is converted into L-2-pyrrolidone-5-carboxylic acid; and (3) hydrolyzing the L-2-pyrrolidone-5-carboxylic acid to L-glutamic acid.

9. A method of producing L-glutamic acid from racemic glutamic acid which comprises: (1) preparing a reaction mixture by combining with an aqueous solution of racemic glutamic acid (a) salicylaldehyde and (b) metallic ion coordinatable with the salicylaldehyde; (2) subjecting said reaction mixture to the action of enzyme of *Pseudomonas cruciviae*, whereby the racemic glutamic acid is converted into L-2-pyrrolidone-5-carboxylic acid; and (3) hydrolyzing the L-2-pyrrolidone-5-carboxylic acid to L-glutamic acid.

10. A method of producing L-glutamic acid from racemic glutamic acid which comprises: (1) preparing a reaction mixture by combining with an aqueous solution of racemic glutamic acid (a) pyridoxal and (b) metallic ion coordinatable with the pyridoxal; (2) subjecting said reaction mixture to the action of enzyme of *Pseudomonas cruciviae*, whereby the racemic glutamic acid is converted into L-2-pyrrolidone-5-carboxylic acid; and (3) hydrolyzing the L-2-pyrrolidone-5-carboxylic acid to L-glutamic acid.

11. A method of producing L-glutamic acid from racemic glutamic acid which comprises: (1) preparing a reaction mixture by combining with an aqueous solution of racemic glutamic acid (a) 5-deoxypyridoxal and (b) metallic ion coordinatable with the 5-deoxypyridoxal; (2) subejcting asid reaction mixture to the action of enzyme of *Pseudomonas cruciviae*, whereby the racemic glutamic acid is converted into L-2-pyrrolidone-5-carboxylic acid; and (3) hydrolyzing the L-2-pyrrolidone-5-carboxylic acid to L-glutamic acid.

12. A method of producing L-glutamic acid from racemic glutamic acid which comprises: (1) preparing a reaction mixture by combining with an aqueous solution of racemic glutamic acid (a) pyridoxal phosphate and (b) metallic ion coordinatable with the pyridoxal phosphate; (2) subjecting said reaction mixture to the action of enzyme of *Pseudomonas cruciviae*, whereby the racemic glutamic acid is converted into L-2-pyrrolidone-5-carboxylic acid; and (3) hydrolyzing the L-2-pyrrolidone-5-carboxylic acid to L-glutamic acid.

13. A method of producing L-glutamic acid from racemic glutamic acid which comprises: (1) preparing a reaction mixture by combining with an aqueous solution of racemic glutamic acid (a) 2-formyl-3-hydroxypyridine and (b) metallic ion coordinatable with the 2-formyl-3-hydroxypyridine; (2) subjecting said reaction mixture to the action of enzyme of *Pseudomonas cruciviae*, whereby the racemic glutamic acid is converted into L-2-pyrrolidone-5-carboxylic acid; and (3) hydrolyzing the L-2-pyrrolidone-5-carboxylic acid to L-glutamic acid.

14. A method of producing L-glutamic acid from racemic acid which comprises: (1) preparing a reaction mixture by combining with an aqueous solution of racemic glutamic acid (a) 4-nitrosalicylaldehyde and (b) metallic ion coordinatable with the 4-nitrosalicylaldehyde; (2) subjecting said reaction mixture to the action of enzyme of *Pseudomonas cruciviae*, whereby the racemic glutamic acid is converted into L-2-pyrrolidone-5-carboxylic acid; and (3) hydrolyzing the L-2-pyrrolidone-5-carboxylic acid to L-glutamic acid.

15. A method of producing L-glutamic acid from racemic glutamic acid which comprises: (1) preparing a reaction mixture by combining with an aqueous solution of racemic glutamic acid (a) 6-nitrosalicylaldehyde and (b) metallic ion coordinatable with the 6-nitrosalicylaldehyde; (2) subjecting said reaction mixture to the action of enzyme of *Pseudomonas cruciviae*, whereby the racemic glutamic acid is converted into L-2-pyrrolidone-5-carboxylic acid; and (3) hydrolyzing the L-2-pyrrolidone-5-carboxylic acid to L-glutamic acid.

16. A method of producing L-glutamic acid from racemic glutamic acid which comprises: (1) preparing a reaction mixture by combining with an aqueous solution of racemic glutamic acid (a) 2-aminobenzaldehyde and (b) metallic ion coordinatable with the 2-aminobenzaldehyde; (2) subjecting said reaction mixture to the action of enzyme of *Pseudomonas cruciviae*, whereby the racemic glutamic acid is converted into L-2-pyrrolidone-5-carboxylic acid; and (3) hydrolyzing the L-2-pyrrolidone-5-carboxylic acid to L-glutamic acid.

17. A method of producing L-2-pyrrolidone-5-carboxylic acid which comprises: (1) preparing a reaction mixture by combining with an aqueous solution of racemic glutamic acid (*a*) aldehyde having in a position ortho to the aldehyde group a radical coordinatable with metal, said aldehyde being a member selected from the group consisting of aromatic and heterocyclic aldehydes, and (*b*) metallic ion coordinatable with the aldehyde and (2) subjecting said reaction mixture to the action of enzyme of *Pseudomonas cruciviae*, whereby the racemic glutamic acid is converted into L-2-pyrrolidone-5-carboxylic acid.

No references cited.